Figure 1:
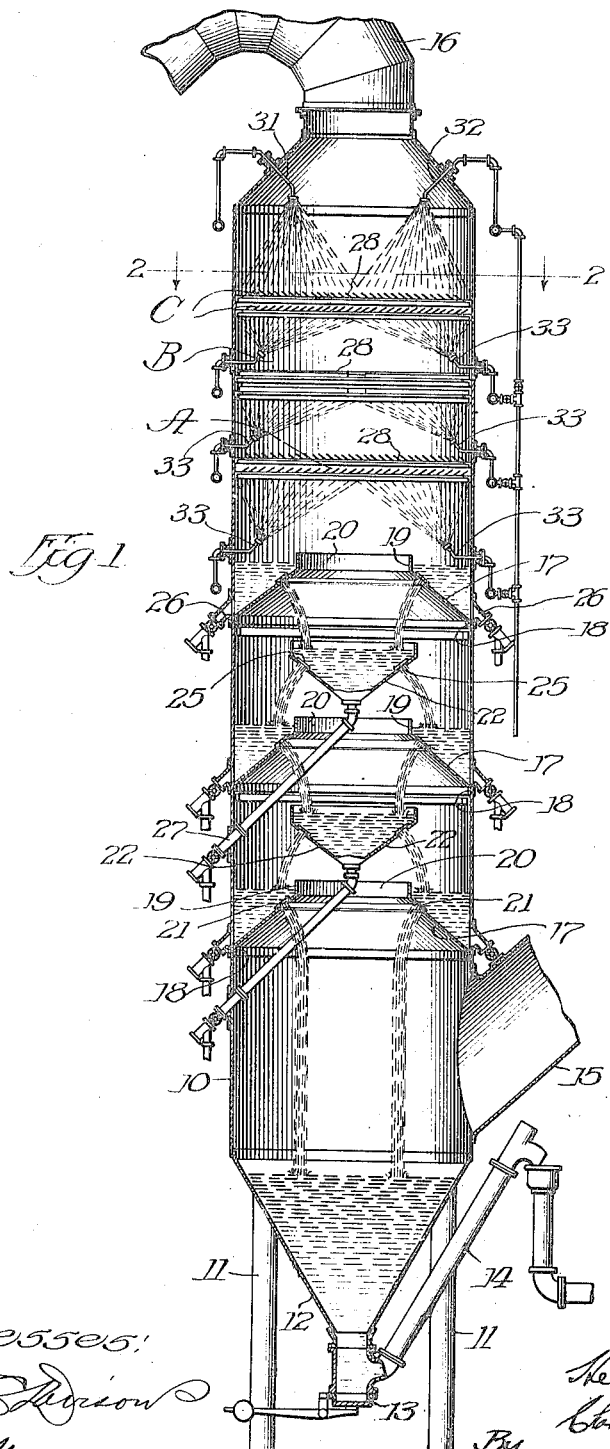

H. A. BRASSERT & C. J. BACON.
GAS WASHER TOWER.
APPLICATION FILED JULY 28, 1915.

1,169,765.

Patented Feb. 1, 1916.
2 SHEETS—SHEET 1.

H. A. BRASSERT & C. J. BACON.
GAS WASHER TOWER.
APPLICATION FILED JULY 28, 1915.
1,169,765.
Patented Feb. 1, 1916.
2 SHEETS—SHEET 2.
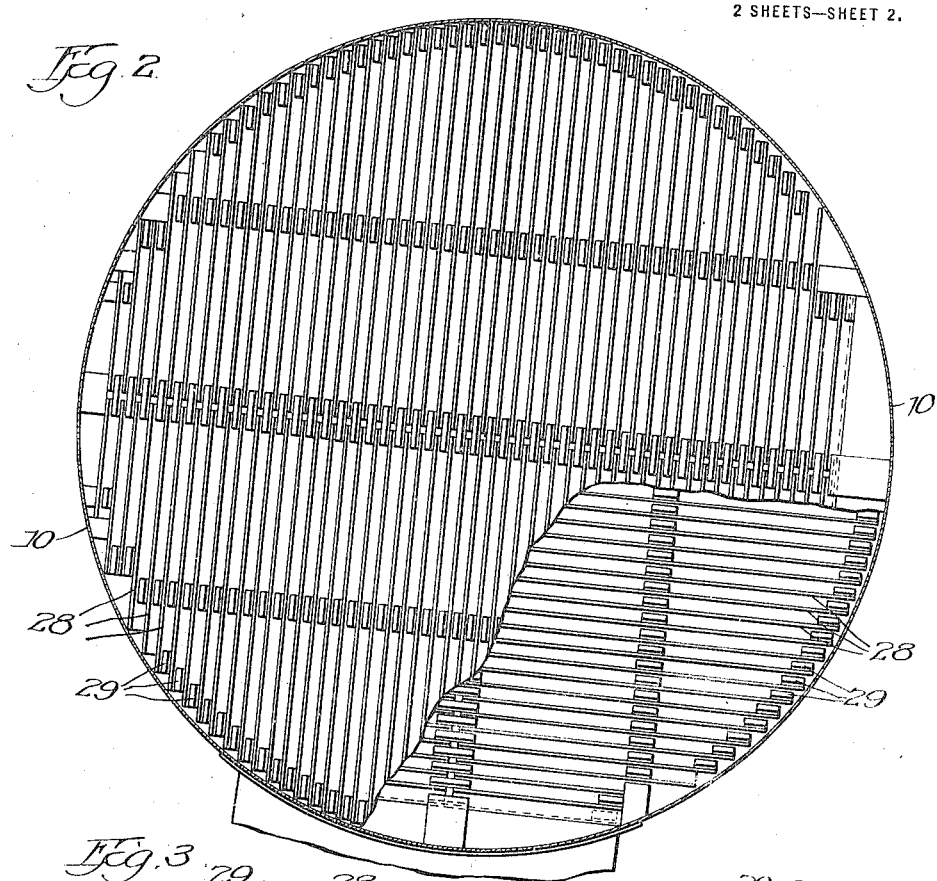
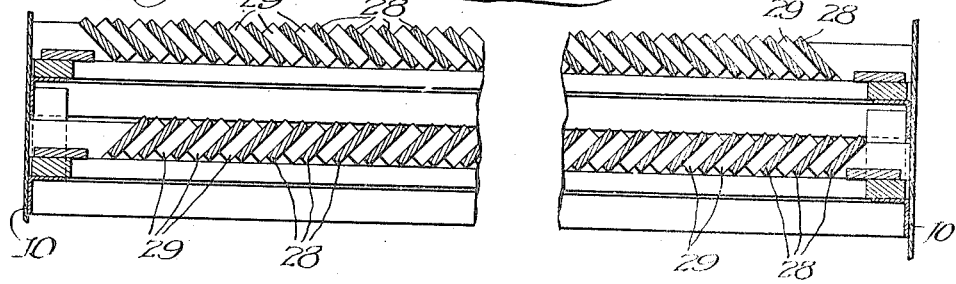
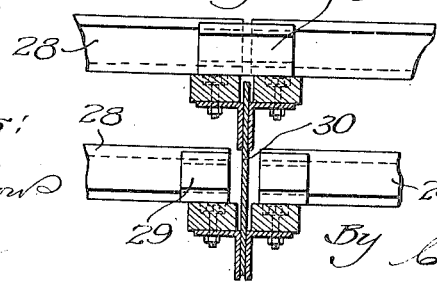

UNITED STATES PATENT OFFICE.

HERMANN A. BRASSERT AND CHARLES J. BACON, OF CHICAGO, ILLINOIS.

GAS-WASHER TOWER.

1,169,765. Specification of Letters Patent. Patented Feb. 1, 1916.

Application filed July 28, 1915. Serial No. 42,361.

*To all whom it may concern:*

Be it known that we, HERMANN A. BRASSERT and CHARLES J. BACON, both citizens of the United States, and residing at Chicago, in the county of Cook and State of Illinois, have invented certain new and useful Improvements in Gas-Washer Towers, of which the following is a specification.

Our invention relates to gas washing and refers to the apparatus used in connection therewith.

While our invention is particularly adapted for use in connection with washing gas from blast furnaces, it may be used for cleaning gas of any description which contains mechanical impurities, such as soot, flue dust, or the like.

In United States Patent No. 1,123,232, which was granted to us on January 5th, 1915, we described a washing tower differing in many essentials from gas washing towers theretofore employed. In experimenting with this tower we have invented a number of improvements hereinafter described, whereby the gas is washed more effectively and with a smaller water consumption, also with less friction loss and less danger of clogging up; we have also provided means by which it can be readily cleaned without interrupting its continuous operation. We have found that in spite of careful screening of the water, solid particles of coke dust and the like remain entrained in the water. The particles will in time stop up a portion of the screen holes, thus interfering with the even water distribution and requiring a larger total amount of water to produce the same results. To avoid this clogging up of the screens we have changed the former shallow dishes, having perforated bottoms, to conical shaped troughs, having the perforated plates on the inclined sides so that accumulations will not settle on the screen surfaces, but will slide off to the bottom of the trough. The water passing through the screen holes forms a shower through which the gas flows transversely, following a zig zag path between the central and outer troughs. We have also found that deposits form in a gas washer wherever there are dead spaces or recesses. To prevent such accumulations we attach the outer troughs directly to the vertical shell eliminating any dead space removed from the path of gas and water. Moreover the conical inclined side of the trough directs the flow of the gas with a minimum of friction loss, thus avoiding any eddy currents which might induce the deposition of sediment. The central troughs are inverted cones with suitably inclined walls which similarly direct the gas on its outward flow.

The bottom of the troughs are provided with outlets, connected by means of inclined conduits to the exterior of the tower and provided with suitable valves at the outside so that any accumulated sediment can be discharged periodically as required. The form of these conduits is such as to allow rods to be inserted with the purpose of dislodging accumulations which will not loosen by the force of the water alone.

By lengthening the path of the gas we are able to more effectively utilize a given height of the tower through keeping gas and water in contact for a longer time for every foot of height. Thus we accomplish the usual amount of cleaning in a minimum height of tower, enabling us to decrease the number of troughs. The vacant space thus gained in the top of the tower we utilize for a second stage of cleaning by the impinging process, which consists of placing a number of inclined baffles against the flow of the gas, which the gas strikes with considerable force, repeatedly changing its direction and acquiring its force by restricted areas. The waste water from these baffles is collected in the upper troughs of the first stage to which they are particularly adapted and thus a complete redistribution of the water takes place.

The invention will be more readily understood by reference to the accompanying drawings, wherein, Figure 1 is a vertical section through a gas washer tower constructed in accordance with our invention; Fig. 2 is an enlarged sectional view on the line 2—2 of Fig. 1, a portion of the baffles being broken away to show the transversely disposed tier therebeneath; Fig. 3 is an enlarged section detail of the baffles employed, and, Fig. 4 is an enlarged fragmentary elevation of the baffles taken at right angles to that of Fig. 3.

Referring more particularly to the drawings, it will be seen that we show a shell 10, mounted on suitable supports 11, which shell is preferably circular, its lower end 12, being contracted to the form of a funnel. A cleaning outlet 13, is provided and an overflow pipe 14, provides for the escape of the dirty water to the sewer. The shell is provided with a gas inlet 15, and an outlet 16.

Our washer has been constructed with the object in view of using the same unit of water a relatively large number of times, bringing it repeatedly into contact with the gas as it ascends. To this end we provide annular troughs 17, secured by the flanges 18, to the shell. These troughs project upwardly and inwardly and terminate in a vertical flange 19, which surrounds an opening 20, concentric of the shell. At a point in the body of the trough, and near its upper end we provide a continuous, screened opening 21, through which the water escapes. Mounted directly in line with the concentric opening 20, is a conical trough 22 suitably held in position. This trough, as in the case of the trough 17, is provided near its upper edge with a continuous screened opening 25.

We have shown three of the outside troughs 17, and two of the inner troughs 22, although the number may be increased or diminished if desired. The arrangement is such that the water flows from the uppermost trough 17 into the uppermost conical trough and from there into the next outer trough until finally it reaches the bottom of the shell. It will be seen that by the provision of the five troughs referred to, we compel the gas to pass through five sheets or falling streams of water and in securing this result we use the same water that number of times. It will be understood that as solid matter is washed out of the gas it will accumulate in the troughs and for this reason we provide the outlets for the water from one trough to the other near the upper edges of the trough where the water is cleaner, the solid matter settling to the bottom of the troughs from which it is removed through the cleaning openings 26, in the case of the outer troughs and the outlets 27, in the case of the inner troughs.

After the gas has passed through the successive stages described, it is freed of its heavier particles of matter and any further washing action must be secured by a finer subdivision of the gas. This we secure by locating in the upper portion of the washer a plurality of small, wooden baffles, as best shown in Figs. 2, 3 and 4. These baffles may consist of rough wood slats 28, located in inclined relation to the vertical axis of the shell and held apart by spacers 29, as shown in Fig. 3. Transverse plates 30, are provided for supporting the slats at the middle of the shell. As best shown in Fig. 1, the first series of baffles comprise two tiers thereof, the baffles of each tier being disposed at an angle of 90° to those of the adjacent tier. The next series of baffles are correspondingly arranged but are disposed longitudinally at an angle of 90° to those of the preceding series, while the next series of baffles are disposed substantially according to the first series. By this arrangement the gas having been freed of its heavy particles of solid matter is taken up and each particle thereof is caused to directly impinge at an angle against wet surfaces and any fine particles of solid matter are caused to adhere to the surface. This arrangement wherein the baffles are closely associated with each other thereby providing narrow openings for the passage of the gas could not advantageously be used in the lower portion of the shell unless the gas were previously cleaned of its heavier particles of solid matter, this for the reason that the openings would soon become clogged.

As a means for supplying the water for the washing we locate a plurality of sprays 31—32, in the upper portion of the tier by means of which water is constantly supplied to the baffles. As a means for cleaning the under surface of the baffles we may provide the sprays 33, these being used at intervals only.

We prefer to dispose of the baffles in different series at different angles; that is to say, the baffles, the lower series of which we have lettered "A" may be spaced farther apart and have a less acute angle of inclination than the baffles in the series "B" and "C," it being intended that the series "C" shall provide for a rather acute angle of deflection of the gases and that the baffles shall be rather closely disposed in order that the cleaning action may be thorough at that point. This is possible because of the removal of practically the entire amount of solid matter and the openings for the passage of the gas will not therefore become clogged.

We claim:

1. In a gas washing tower, the combination of a shell, a plurality of annular troughs secured to the inner wall of the shell and disposed to provide an opening concentric of the shell and a supplementary trough disposed intermediately of said annular troughs and located substantially in line with the concentric opening provided through said troughs, said annular troughs being provided with water escape openings near the upper edge thereof wherby water is caused to flow into said supplementary trough, substantially as described.

2. In a gas washing tower, the combination of a shell, a plurality of annular troughs secured to the inner wall of the shell and disposed to provide an opening concentric of the shell and a supplementary trough disposed intermediately of said annular troughs and located substantially in line with the concentric opening provided through said troughs, both said supplementary and said annular troughs being provided with water escape apertures near the upper edges thereof, whereby water is caused to flow from an annular trough into said supplementary trough and from the latter trough into an annular trough, substantially as described.

3. In a gas washing tower, the combination of a vertically disposed shell, a plurality of annular troughs projecting inwardly from the wall thereof and disposed to provide an axial opening, an intermediate cone-shaped trough with its axis substantially coincident with the axis of the shell, each of said annular troughs being provided with a continuous opening in the body of the trough near the upper edge thereof whereby a sheet of water is caused to flow into the intermediate trough, substantially as described.

4. In a gas washing tower, the combination of a shell, a plurality of troughs so disposed as to cause the passage of gas through a sheet of water a plurality of times in its ascent in said tower, and a plurality of series of staggered baffles located in the upper portion of said tower whereby the gas having been washed of its heavier particles in its passage through the lower portion of the tower is caused to impinge against wet surfaces disposed at an angle to the flow of the gas, substantially as described.

5. In a gas washing tower, the combination of a shell, a plurality of troughs so disposed as to cause the passage of gas through a sheet of water a plurality of times in its ascent in said tower, and a plurality of series of staggered baffles located in the upper portion of said tower, one series of baffles being disposed at right angles to another series thereof and the angles of inclination of said baffles being such that the gas is caused to be subdivided and to impinge against a multitude of wetted surfaces after having been cleaned of its heavier particles of solid matter, substantially as described.

6. In a gas washing tower, the combination of a shell, a plurality of devices in the lower portion of said shell for rough washing the gas, and a plurality of wooden slats in the upper portion of the tower, one series of slats being disposed at right angles to another series thereof, and the angle of inclination of said slats being such that the gas is caused to be subdivided and to impinge against a multitude of wetted surfaces after having been cleaned of its heavier particles of solid matter, substantially as described.

7. In a gas washing tower, the combination of a shell, a plurality of devices in the lower portion of the shell for rough washing the gas, and a plurality of wooden slats disposed transversely of the shell and located in the upper portion thereof, said slats being disposed in a plurality of tiers, each tier being angularly disposed with relation to an adjacent tier and one series of slats being disposed longitudinally at right angles to an adjacent series, substantially as described.

Signed at Chicago, Illinois, this 22nd day of July, 1915.

HERMANN A. BRASSERT.
CHARLES J. BACON.

Witnesses:
A. J. DREW,
W. J. WHITE.